(12) United States Patent
Wang

(10) Patent No.: US 11,074,810 B2
(45) Date of Patent: Jul. 27, 2021

(54) METHOD AND DEVICE FOR PROVIDING FEEDBACK TO OUTSIDE OF VEHICLE, DEVICE, AND STORAGE MEDIUM

(71) Applicant: BAIDU ONLINE NETWORK TECHNOLOGY (BEIJING) CO., LTD., Beijing (CN)

(72) Inventor: Ya Wang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/555,229

(22) Filed: Aug. 29, 2019

(65) Prior Publication Data

US 2020/0074847 A1   Mar. 5, 2020

(30) Foreign Application Priority Data

Aug. 31, 2018   (CN) .......................... 201811013806.9

(51) Int. Cl.
| | |
|---|---|
| *G08G 1/005* | (2006.01) |
| *G06K 9/00* | (2006.01) |
| *B60Q 1/50* | (2006.01) |
| *B60Q 5/00* | (2006.01) |

(52) U.S. Cl.
CPC .............. *G08G 1/005* (2013.01); *B60Q 1/503* (2013.01); *B60Q 5/006* (2013.01); *G06K 9/00335* (2013.01); *G06K 9/00362* (2013.01); *G06K 9/00791* (2013.01)

(58) Field of Classification Search
CPC .... G08G 1/005; G08G 1/166; G06K 9/00791; G06K 9/00335; G06K 9/00362; B60Q 5/006; B60Q 1/503; B60Q 1/525; B60R 1/00; B60R 2300/8033; B60R 2300/50
See application file for complete search history.

(56) References Cited

U.S. PATENT DOCUMENTS 9,142,127 B1 *   9/2015   McDevitt-Pimbley ...................... G08G 1/096708
9,196,164 B1 *   11/2015   Urmson ................. G08G 1/166
9,336,436 B1   5/2016   Dowdall
(Continued)

FOREIGN PATENT DOCUMENTS

| CN | 106169244 A | 11/2016 |
|---|---|---|
| CN | 108248504 A | 7/2018 |

(Continued)

OTHER PUBLICATIONS

European Patent Application No. 19194264.8 extended Search and Opinion dated Jan. 24, 2020, 9 pages.
(Continued)

*Primary Examiner* — Adnan Aziz
(74) *Attorney, Agent, or Firm* — Lathrop GPM LLP

(57) ABSTRACT

Embodiments of the present disclosure provide a method and a device for providing feedback to outside a vehicle, a device, and a computer readable storage medium. The method includes: detecting an attention state of a pedestrian to the vehicle, wherein the attention state is configured to indicate whether the pedestrian notices the vehicle; determining feedback information of the vehicle to the pedestrian based at least in part on the attention state; and controlling an output component of the vehicle to output the feedback information.

17 Claims, 4 Drawing Sheets

(56) References Cited

U.S. PATENT DOCUMENTS

| | | | |
|---|---|---|---|
| 9,834,139 B1 | 12/2017 | Park et al. | |
| 9,881,503 B1* | 1/2018 | Goldman-Shenhar | G08G 1/166 |
| 9,928,734 B2* | 3/2018 | Newman | G08G 1/005 |
| 9,947,215 B2* | 4/2018 | Di Censo | G08G 1/005 |
| 10,311,770 B2* | 6/2019 | Ishizuka | B60Q 1/24 |
| 10,315,563 B1* | 6/2019 | Harper | B60Q 5/008 |
| 10,497,255 B1* | 12/2019 | Shmueli Friedland | G08G 1/005 |
| 2011/0199199 A1* | 8/2011 | Perkins | B60Q 9/008 340/435 |
| 2013/0235200 A1* | 9/2013 | Giesler | B60R 1/00 348/148 |
| 2014/0062685 A1* | 3/2014 | Tamatsu | B60Q 5/005 340/425.5 |
| 2015/0035685 A1* | 2/2015 | Strickland | B60Q 1/525 340/901 |
| 2015/0109148 A1* | 4/2015 | Cheatham, III | G01S 7/4804 340/944 |
| 2015/0158426 A1 | 6/2015 | Sonoda | |
| 2015/0258928 A1* | 9/2015 | Goto | B60Q 1/24 701/49 |
| 2016/0167648 A1* | 6/2016 | James | G06F 3/017 701/28 |
| 2017/0076578 A1* | 3/2017 | Tsubouchi | G06F 3/011 |
| 2017/0109591 A1* | 4/2017 | Sakuragi | G01C 21/3676 |
| 2017/0341580 A1* | 11/2017 | Okuda | B60R 1/00 |
| 2018/0033306 A1 | 2/2018 | Kim et al. | |
| 2018/0086339 A1* | 3/2018 | Hanna | G06K 9/00845 |
| 2018/0126902 A1 | 5/2018 | Seo et al. | |
| 2018/0129981 A1* | 5/2018 | Fujimoto | G05D 1/0223 |
| 2018/0144207 A1* | 5/2018 | Shigemura | G01S 13/862 |
| 2018/0174460 A1* | 6/2018 | Jung | B60Q 1/525 |
| 2018/0178719 A1 | 6/2018 | Min | |
| 2018/0186368 A1* | 7/2018 | Kim | G06K 9/00369 |
| 2018/0222490 A1* | 8/2018 | Ishihara | B60W 50/14 |
| 2018/0236985 A1* | 8/2018 | Kim | G06F 16/2365 |
| 2018/0261081 A1* | 9/2018 | Suzuki | B60Q 1/50 |
| 2018/0276986 A1* | 9/2018 | Delp | G08G 1/005 |
| 2018/0319325 A1* | 11/2018 | Tatara | B60Q 1/0035 |
| 2018/0326982 A1* | 11/2018 | Paris | B60W 50/0097 |
| 2019/0016257 A1* | 1/2019 | Sakata | G07C 5/0825 |
| 2019/0043362 A1* | 2/2019 | Morimura | B60Q 1/0035 |

FOREIGN PATENT DOCUMENTS

| | | |
|---|---|---|
| JP | 2006163637 A | 6/2006 |
| JP | 2016065938 A | 4/2016 |
| JP | 2017140929 A | 8/2017 |
| JP | 2018028806 A | 2/2018 |
| WO | WO 2017138146 A1 | 8/2017 |
| WO | WO 2017138148 A1 | 8/2017 |

OTHER PUBLICATIONS

Chinese Patent Application No. 201811013806.9, Office Action dated Apr. 15, 2020, 8 pages.

Chinese Patent Application No. 201811013806.9, English translation of Office Action dated Apr. 15, 2020, 10 pages.

Japanese Patent Application No. 2019-157033, Office Action dated Nov. 4, 2020, 4 pages.

Japanese Patent Application No. 2019-157033, English translation of Office Action dated Nov. 4, 2020, 4 pages.

* cited by examiner

METHOD AND DEVICE FOR PROVIDING FEEDBACK TO OUTSIDE OF VEHICLE, DEVICE, AND STORAGE MEDIUM

CROSS-REFERENCE TO RELATED APPLICATIONS

This application claims priority to and benefits of Chinese Patent Application No. 201811013806.9, filed with the National Intellectual Property Administration of P. R. China on Aug. 31, 2018, the entire contents of which are incorporated herein by reference.

TECHNICAL FIELD

Embodiments of the present disclosure relate to the field of vehicle interaction, and more particularly, to a method for providing feedback to outside a vehicle, a device for providing feedback to outside a vehicle, a device, and a computer readable storage medium.

BACKGROUND

Vehicles often need to interact with pedestrians and other vehicles while traveling on the road. Regardless of whether the vehicle has or does not have automatic driving capability, it can generally transmit feedback information (such as driving intention of the vehicle, warning of possible emergencies, etc.) to pedestrians through driving actions, vehicle lights, whistling, etc. When a vehicle approaches a pedestrian at a low speed, the driver or passenger in the vehicle may convey information to the pedestrian through verbal language or non-verbal actions such as gestures and expressions. By providing feedback information to the pedestrians outside the vehicle, security incidents can be reduced.

SUMMARY

Embodiments of an aspect of the present disclosure provide a method for providing feedback to outside a vehicle. The method includes: detecting an attention state of a pedestrian to the vehicle, in which the attention state is configured to indicate whether the pedestrian notices the vehicle; determining feedback information of the vehicle to the pedestrian based at least in part on the attention state; and controlling an output component of the vehicle to output the feedback information.

Embodiments of another aspect of the present disclosure provide a device including one or more processors and a storage device. The storage device is configured to store one or more programs that, when executed by the one or more processors, causes the one or more processors to implement the method according to embodiments of the first aspect of the present disclosure.

Embodiments of another aspect of the present disclosure provide a computer readable storage medium having stored thereon a computer program that, when executed by a processor, causes the method according to the embodiments of the first aspect of the present disclosure to be implemented.

It is to be understood that, the content described in the summary is not intended to limit the key or important features of the present disclosure, or the scope of the present disclosure. Other features of the present disclosure will be readily understood by the following description.

BRIEF DESCRIPTION OF THE DRAWINGS

These and other aspects and advantages of embodiments of the present disclosure will become apparent and more readily appreciated from the following descriptions made with reference to the drawings. In the drawings, the same or similar reference numerals indicate the same or similar elements, in which.

DETAILED DESCRIPTION

Figure 1:
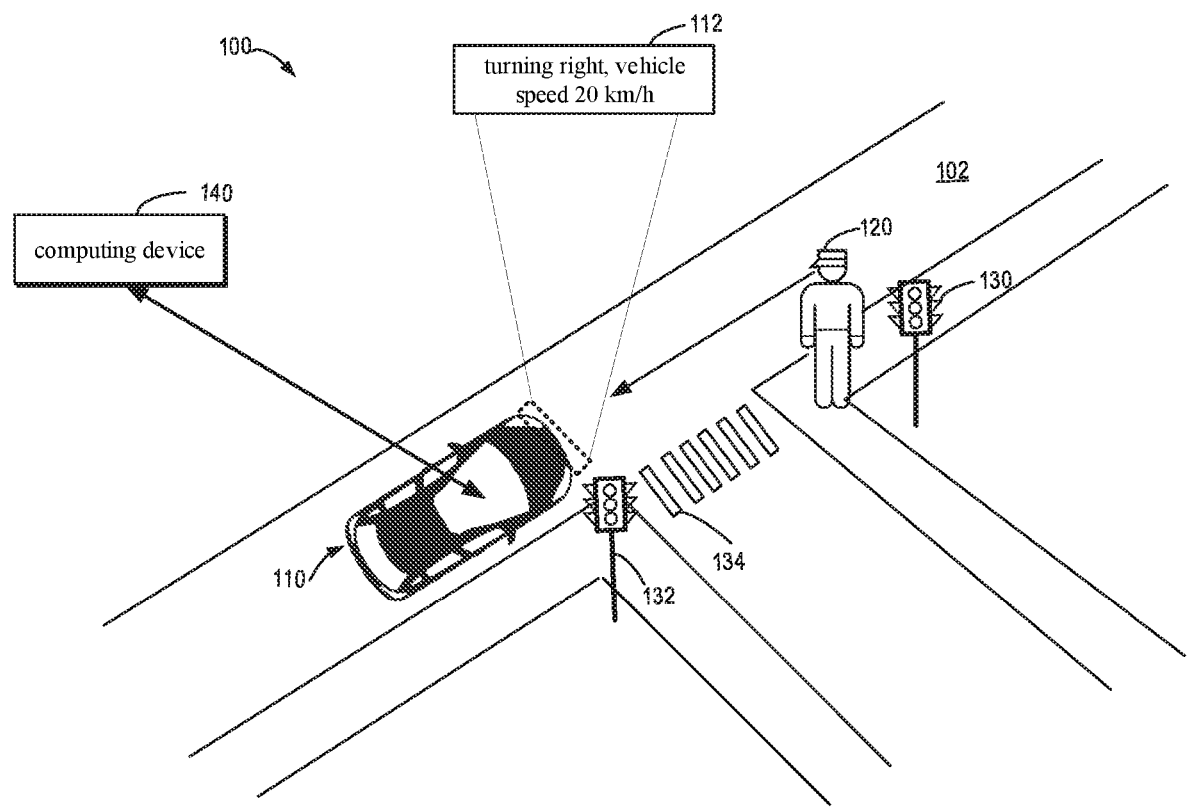
FIG. 1 is a schematic diagram of an exemplary environment for implementing an embodiment of the present disclosure.

The present disclosure will be described in detail below with reference to the accompanying drawings. Although certain embodiments of the present disclosure are shown in the drawings, it should be understood that, the present disclosure may be implemented in various forms, and should not be construed as being limited to the embodiments set forth herein. Instead, the embodiments are provided to provide a more complete and clear understanding of the present disclosure. It should be understood that, the drawings and embodiments of the present disclosure are for illustrative purpose only and are not intended to limit the scope of the present disclosure.

In the description of embodiments of the present disclosure, the term "include" and the like should be understood as open inclusion, i.e., "including but not limited to". The term "based on" should be understood as "at least partially based on". The term "one embodiment" or "the embodiment" should be understood as "at least one embodiment". The terms "first", "second" and the like may refer to different or identical objects. Other explicit and implicit definitions may also be included below.

As mentioned above, vehicles need to provide feedback information to the pedestrian while traveling. At present, feedback information is mainly provided based on judgment of the surrounding environment of the vehicle. Vehicles with automatic environment detection capabilities, such as unmanned vehicles equipped with a corresponding device, may automatically detect the external environment in which the vehicle and the pedestrian are located through a sensor or the like to determine the corresponding feedback information. For example, the vehicle may determine whether to whistle by detecting whether there is the pedestrian on the road. Vehicles without automatic environment detection capabilities, such as vehicles operated by the driver, may need to rely on the driver's subjective judgment to determine whether to prompt the pedestrian by the output device of the vehicle or by the driver. However, it may be insufficient to prompt the pedestrian to provide feedback information merely based on the external traffic environment.

In recent years, unmanned technology has gradually emerged. More and more enterprises begin to invest in research and development of unmanned driving. It is expected that unmanned vehicles may appear on the road in the future. Due to the disappearance of the driver character in the unmanned vehicle, the interaction with the pedestrian based on subjective judgment of the driver may disappear. It may be impossible to meet the requirement of interaction between the vehicle and pedestrian to provide feedback information merely based on the traffic rule and the external environment.

Embodiments of the present disclosure provide a solution for providing feedback to outside a vehicle. In the solution, the attention state of the pedestrian to the vehicle is detected, and feedback information is determined and outputted to the pedestrian based at least on the attention state. The solution of the present disclosure is capable of providing targeted feedback information based on the attention state of the pedestrian to the vehicle, which can make the interaction between the pedestrian and the vehicle more efficient and useful, and can allow the pedestrian to obtain useful information in the short interaction time, so as to ensure a safety environment for the pedestrians on the road.

Embodiments of the present disclosure will be described below with reference to the drawings. FIG. 1 is a schematic diagram of an exemplary environment 100 for implementing an embodiment of the present disclosure. In the exemplary environment 100, a vehicle 110 is traveling on a road 102, and a pedestrian 120 is located near the vehicle 110. The exemplary environment 100 also shows some exemplary traffic guidance facilities, such as traffic lights 130, 132, and a pedestrian crosswalk 134.

In the present disclosure, the term "pedestrian" is relative to the driver or the passenger in the vehicle 110 or other vehicles. The pedestrian 120 may be walking, staying, in or operating other non-motorized vehicles (such as scooters, bicycles) on the road, or performing other actions. The vehicle 110 may be any type of vehicle that can carry persons and/or objects and be powered by a power system such as an engine, including but not limited to cars, trucks, buses, electric vehicles, motorcycles, recreational vehicles, trains, etc. The vehicle 110 may have an autonomous driving capability, such as an unmanned vehicle. Certainly, the vehicle 110 may not have the autonomous driving capability, such as a vehicle operated by a driver.

The vehicle 110 may be communicatively coupled to a computing device 140. Although illustrated as a separate entity, the computing device 140 may be embedded in the vehicle 110. The computing device 140 may also be an entity external to the vehicle 110, and can communicate with the vehicle 110 via a wireless network. The computing device 140 can be implemented as one or more computing devices including at least a processor, a memory, and other components typically found in a general-purpose computer, for performing functions such as computing, storage, communication, control, etc.

It should be understood that, the environment 100 shown in FIG. 1 is merely an example, and the environment 100 may include more, fewer, or different objects depending on actual conditions. For example, the arrangement of one or more of the road, the position and number of the vehicles on the road, the position and number of pedestrians on the road, the relative position of the pedestrian and the vehicle, and traffic guidance facilities may vary. The feedback information 112 shown in FIG. 1 is only an example. The vehicle 110 may output other feedback information in other forms.

When the vehicle 110 is traveling (rather than parking), it may provide feedback information 112 to the pedestrian 120. The feedback information 112 is configured to transmit information such as guidance, restriction, warning, or instruction to the pedestrian 120. For example, in FIG. 1, the vehicle 110 may display feedback information 112 by a display screen on a front side thereof, the feedback information 112 may include text such as "turning right, vehicle speed 20 km/h". Such feedback information 112 can convey the driving condition such as the travel route and the driving speed of the vehicle 110 to the pedestrian 120, and the pedestrian 120 can quickly learn the travel direction and travel route of the vehicle 110, thereby ensuring the safety of the pedestrian on the road.

According to an embodiment of the present disclosure, the feedback information 112 outputted by the vehicle 110 is based at least in part on the attention state of the pedestrian 120 to the vehicle 110. The prompt of external feedback information to the pedestrian may be related to the attention state of the pedestrian to the vehicle. For example, when the pedestrian crossing the road fails to notice the vehicle that is approaching, the pedestrian may not notice the vehicle by the signal light, in this case, the vehicle may whistle to make the pedestrian notice it. However, when the pedestrian notices the vehicle, the vehicle may display a prompt message on its display screen without whistling.

Figure 2A:
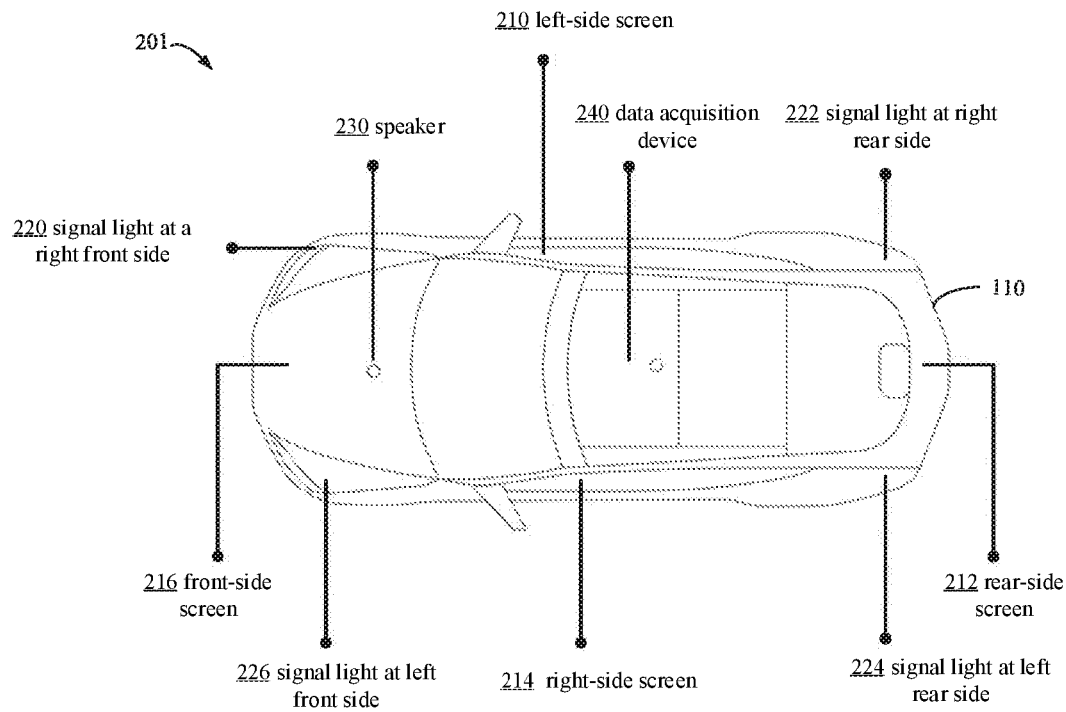
FIG. 2A is a schematic diagram of a top view of a vehicle according to an embodiment of the present disclosure.

The content and the presentation manner of the feedback information 112 may depend on hardware configuration of the vehicle 110. In the following, the hardware configuration of the vehicle 110 will be described with reference to FIGS. 2A-2C. FIG. 2A is a schematic diagram of a top view 201 of the vehicle 110. As shown in FIG. 2A, the vehicle 110 includes one or more display screens mounted external to it. The one or more display screens may include a left-side screen 210, a right-side screen 214, a rear-side screen 212, and a front-side screen 216. The left-side screen 210 and the right-side screen 214 are mounted at a side of the vehicle 110, the rear-side screen 212 is mounted at a rear portion of the vehicle 110, and the front-side screen 216 is mounted at a front portion of the vehicle 110. The rear-side screen 212 can be clearly seen from FIG. 2B, which illustrates a rear view 201 of the vehicle 110. The display screen may be any type of screen capable of displaying feedback information in the form of text, images, and/or animations. In addition to the screens shown in FIG. 2A, the vehicle 110 may also be mounted with one or more other screens in other positions.

As can be seen from FIG. 2A, the vehicle 110 may also include one or more signal lights for emitting light. The one or more signal lights may be located at different positions of the vehicle 110. For example, as shown in FIG. 2A, the signal light may include a signal light 220 located at a right front side of the vehicle 110, a signal light 222 located at a right rear side of the vehicle 110, a signal light 224 located at a left rear side of the vehicle 110, and a signal light 226 located at a left front side of the vehicle 110. The signal lights 220, 222, 224 and 226 may be, for example, a ray lamp. The vehicle 110 may also include other types of lights. FIG. 2C illustrates a side view 203 of the vehicle 110, as can be seen from the side view 203, in addition to the side screen (such as the left-side screen 210) of the vehicle 110, the vehicle 110 may also include a streamline light strip 228 mounted to a side of the vehicle 110. The signal light, including the ray light and the light strip, may be any type of light capable of outputting feedback information in a light form.

The vehicle 110 may also include one or more speakers, as shown in FIG. 2A, the vehicle 110 includes a speaker 230 located at its front side. It should be understood that, the vehicle 110 may include one or more other speakers located at other positions. The speaker 230 can be configured to output feedback information in an audible form.

In addition to the device for information output, the vehicle 110 may also include one or more devices for data acquisition, such as a data acquisition device 240 located on the top of the vehicle 110. The data acquisition device 240 may be an image capture device, such as a video camera, and/or other types of sensors that can be used to sense data. It should also be understood that, the vehicle 110 may include one or more other data acquisition devices located at other positions.

Figure 2B:
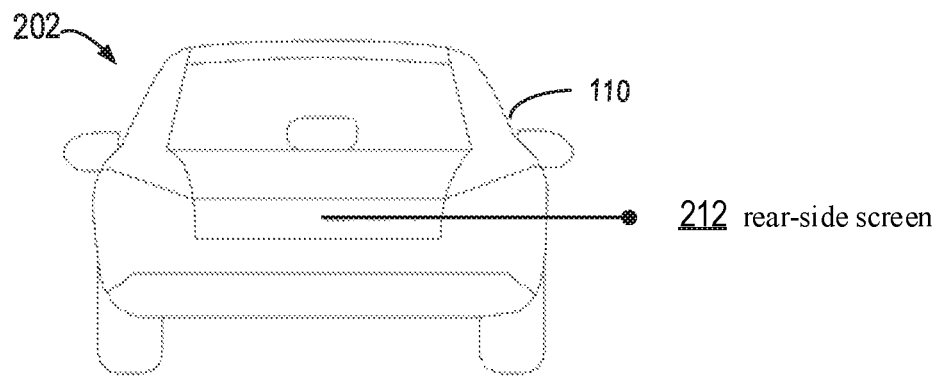
FIG. 2B is a schematic diagram of a rear view of a vehicle according to an embodiment of the present disclosure.
Figure 2C:
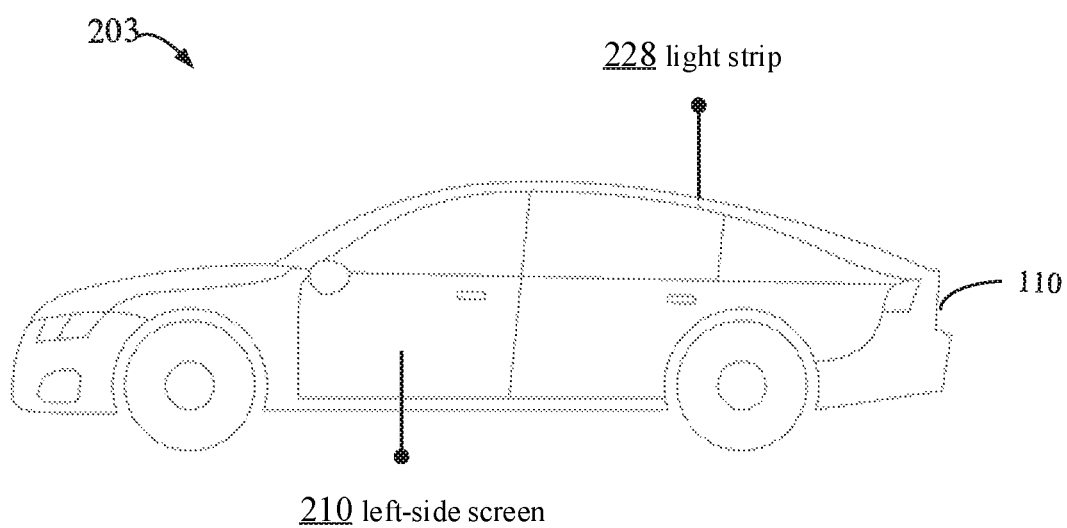
FIG. 2C is a schematic diagram of a side view of a vehicle according to an embodiment of the present disclosure.

The hardware configuration of the vehicle 110 shown in FIGS. 2A-2C is merely an example, depending on the type and configuration of the vehicle 110, the type, the number and the arrangement of the hardware devices for outputting feedback information and for data acquisition may vary, embodiments of the present disclosure are not limited in this regard.

Figure 3:
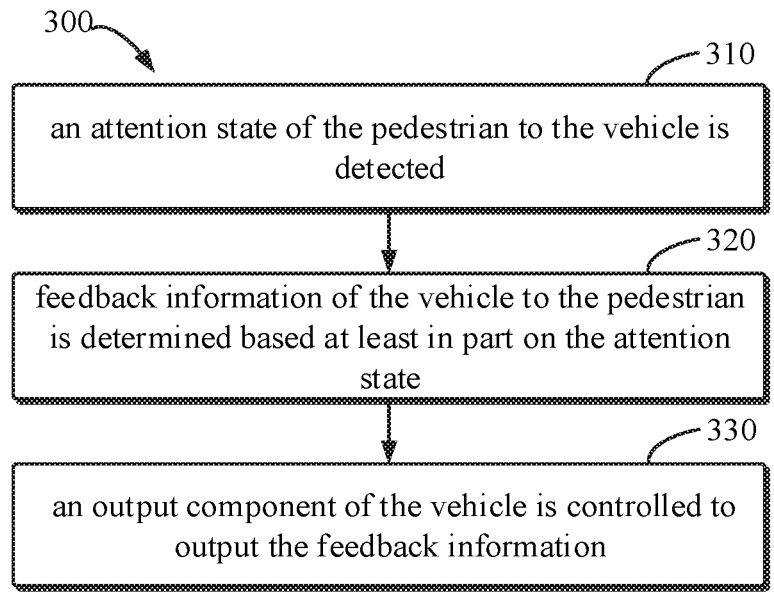
FIG. 3 is a flow chart of a method for providing feedback to outside a vehicle according to an embodiment of the present disclosure.

The control of the vehicle 110 to provide feedback information 112 based on the attention state will be described below with reference to FIG. 3. FIG. 3 is a flow chart of a process 300 for providing a feedback outside the vehicle according to an embodiment of the present disclosure. The process 300 may be implemented by the computing device 140, which may be embedded in the vehicle 110 or as a separate device external to the vehicle 110. For convenience of description, the process 300 will be described in combination with FIG. 1.

At block 310, the computing device 140 detects an attention state of the pedestrian 120 to the vehicle 110.

The attention state may be configured to indicate whether the pedestrian 120 notices the vehicle 110, for example, whether the pedestrian 120 is looking at the vehicle 110. In an implementation, when the pedestrian 120 notices the vehicle 110, the attention state may also be configured to indicate the position of the vehicle 110 noticed by the pedestrian 120. For example, the pedestrian 120 is looking at the front, the side, or the rear of the vehicle 110.

The attention state may be detected based on attention recognition technology. In an implementation, the computing device 140 may obtain image information of the ambient environment of the vehicle 110 captured in real time, and determine whether there is a pedestrian 120 in the ambient environment by data analysis. The image information may be acquired in real time by the data acquisition device 240 of the vehicle 110. For example, the data acquisition device 240 may be configured to capture the image of the ambient environment in one or more directions of the vehicle 110. In this case, the data acquisition device 240 may include one or more image acquirers, each of which is configured to capture images in different directions. The data acquisition device 240 may also include a panoramic image acquisition device capable of capturing images at a wider angle. In addition to the data acquisition device carried by the vehicle 110, the data may also be acquired by the data acquisition devices located external to the vehicle 110, such as the data acquisition device of other vehicles located on either side of the road 102 or on the road 102.

The detection of the presence of the pedestrian 120 may be based on, for example, object recognition technology in image analysis technology. In an implementation, in addition to detecting the presence of the pedestrian by analyzing the acquired image, the presence of the pedestrian 120 may also be determined by other sensing data such as infrared sensing. In an embodiment, only pedestrians located within a predetermined distance range of the vehicle 110 may be detected, as feedback information 112 may be more suitable for pedestrians that are closer to the vehicle 110.

When it is determined that there is the pedestrian 120 in the external environment of the vehicle 110, the computing device 140 may analyze the posture, the motion, the orientation of the face of the pedestrian 120, and the relative position of the pedestrian 120 and the vehicle 110 based on the image information acquired, to determine whether the pedestrian 120 notices the vehicle, and to determine the position of the vehicle 110 that may be noticed by the pedestrian 120. The detection of the presence of the pedestrian 120 and the attention state to the vehicle 110 may be based on corresponding technology existed or to be developed in the related, the scope of the present disclosure is not limited in this respect.

At block 320, the computing device 140 determines feedback information 112 of the vehicle 110 to the pedestrian 120 based at least in part on the attention state.

According to an embodiment of the present disclosure, the computing device 140 may determine different feedback information for output by the vehicle 110 depending on whether the pedestrian 120 notices the vehicle 110, and/or the position of the vehicle 110 noticed by the pedestrian 120. The feedback information 112 may be configured to convey information such as guidance, restriction, warning or instruction to the pedestrian 120. In an implementation, for the safety of the vehicle and the pedestrian, the feedback information 112 may include guidance information for travel of the pedestrian, warning information related to a traffic rule, instruction information related to a current traffic condition, and instruction information related to a driving condition of the vehicle. In an implementation, the feedback information 112 may include interactive information, such as a greeting to the pedestrian 120, an automatic driving condition of the vehicle 110, a weather condition, a traffic condition nearby, etc. More specific examples of the feedback information 112 will be described in detail below.

In some embodiments, when the attention state indicates that the pedestrian 120 fails to notice the vehicle 110, the computing device 140 may determine at least the feedback information 112 in an audible form. For example, when the vehicle 110 is approaching the pedestrian 120, and the pedestrian 120 is looking to other directions or playing with other persons without noticing the vehicle 110, the feedback information in the audible form may be more easily known to the pedestrian 120. The feedback information 112 in the audible form may be outputted by, for example, the speaker 230 of the vehicle 110. The feedback information may include horn, and/or audio with preset content. In an embodiment, the feedback information in the audible form may be directionally transmitted to the pedestrian 120. In addition to the audible sound, when the attention state indicates that the pedestrian 120 fails to notice the vehicle 110, the vehicle 110 may also determine feedback information 112 in a visual form, such as feedback information in the form of visible light. When the pedestrian 120 fails to notice the vehicle 110 currently, the visible light may cause the pedestrian 120 to shift his/her attention from current gaze direction or ongoing motion to the travel direction of the vehicle 110.

In some embodiments, when the attention state indicates that the pedestrian 120 notices the vehicle 110, the computing device 140 may determine at least the feedback information 112 in a visual form. In the case where the pedestrian 120 notices the vehicle 110, the feedback information in the visual form may allow the pedestrian 120 to quickly learn the situation. The feedback information 112 in the visual form may include text, images, and/or animations displayed via one or more display screens of the vehicle 110, such as the display screens 210, 212, 214, and/or 216 shown in FIG. 2A. The feedback information 112 in the visual form may also include feedback information in the form of visible light. The feedback information 112 in the form of visible light may be outputted by one or more signal lights of the vehicle 110, such as the signal lights 220, 222, 224, 226 and/or the light strip 228, etc. Certainly, in addition to the feedback information in the visual form, in the event that the pedestrian 120 notices the vehicle 110, the computing device 140 may additionally determine feedback information in the audible form.

When the pedestrian 120 notices the vehicle 110, the attention state may also indicate a preset position of the vehicle 110 noticed by the pedestrian 120, and the computing device 140 can determine the output component of the vehicle 110 for outputting the feedback information 112 based on the preset position. For example, when it is detected that the pedestrian 120 is located in front of the vehicle 110, it may be determined that the feedback information is outputted by the front-side screen 216 and/or the front-side lights 220 and 226. In some cases, the determination of the output component may constrain the content of the feedback information 112 to be output, the feedback information 112 may include text or image constrain displayed by the display screen, or a feedback signal indicated by the signal light.

The embodiment of determining the feedback information 112 based on the attention state of the pedestrian 120 to the vehicle 110 are described above. In another embodiment, in addition to the attention state, the computing device 140 may also detect an environmental factor associated with at least one of the vehicle 110 and the pedestrian 120, and determine the feedback information 112 based on the environmental factor. The environment in which the vehicle 110 and/or the pedestrian 120 are currently located may affect the content and the output form of the feedback information.

The environmental factor that may affect the feedback information 112 may include a condition of the road 102 on which the vehicle 110 is traveling, such as whether it is close to a junction, the type of the junction (e.g., an intersection, or a T-junction), whether the road 102 is spacious (e.g., whether the road 102 is sufficient to accommodate simultaneous passing of the pedestrian and the vehicle), whether the road surface of the road 102 is flat, whether the road 102 is in the tunnel, etc. The environmental factor may also include a condition of a traffic guidance facility on the road 102 on which the vehicle 110 is traveling, such as whether there are traffic lights, whether the traffic lights are operating correctly, whether there are road traffic signs (such as pedestrian crossings, turn signs, etc.). When the traffic guidance facility is inadequate, the vehicle 110 may actively output additional guidance information as feedback information 112.

In an embodiment, the environmental factor may also include an expected motion trajectory of the vehicle 110, and/or an expected motion trajectory of the pedestrian 120. The expected motion trajectory of the vehicle 110 may be provided by the vehicle 110. For example, for a vehicle 110 having an automatic driving capability, its motion trajectory may be preset. Certainly, the motion trajectory of the vehicle 110 may also be determined by analyzing its driving operation, and this manner can be applicable to the vehicle 110 with or without the automatic driving capability. The expected motion trajectory of the pedestrian 120 may be determined based on the acquired image including the pedestrian 120 or other type of sensing data. The expected motion trajectories of the vehicle 110 and the pedestrian 120 may be used to determine whether the vehicle 110 and the pedestrian 120 will converge or the distance between them will be shortened or increased. The motion trajectory of the pedestrian 120 may be used to determine the behavior and the intent of the pedestrian 120, such as whether to enter or leave the motorway, whether to cross the road barrier, whether to turn, etc.

Further, the environmental factor may also include a predetermined behavior of the pedestrian 120, such as whether the pedestrian 120 is making a call, talking or playing with someone else, listening to music or reading, greeting the vehicle 110, etc. The predetermined behavior may also include, for example, whether the pedestrian 120 is to enter or leave the motorway, whether pedestrian 120 is to cross the road barrier, or the like. In at least one embodiment, the environmental factor may also include a lighting condition outside the vehicle 110. The lighting condition may be related to the current time, and/or the current traffic environment in which the vehicle 110 and the pedestrian 120 are located. For example, the lighting condition in daytime is generally better, lighting at night mainly relies on streetlights, or when the vehicle 110 and the pedestrian 120 are in the tunnel, even in daylight, the lighting may also rely on streetlights.

Examples of the environmental factor are given above. The environmental factor may directly or indirectly affect the content and/or the output manner (e.g., the output component for outputting the feedback information) of the feedback information 112. The computing device 140 may determine the feedback information 112 based on one or more of the above environmental factors. Examples of determining the feedback information 112 based on the environmental factor (and based on the attention state) will be described in detail below.

With reference to FIG. 3, at block 330, the computing device 140 controls an output component of the vehicle 110 to output the feedback information 112. In the case where the computing device 140 is embedded in the vehicle 110, the computing device 140 may directly send an instruction for outputting feedback information to the output component, the instruction includes the feedback information 112 to be outputted. In the case where the computing device 140 is an entity independent of the vehicle 110, the computing device 140 may send an instruction for outputting feedback information to a control system of the vehicle 110, instruction includes the feedback information 112 to be outputted. In this case, the control system of the vehicle 110 may control the corresponding output component to output the feedback information 112.

In the above embodiments, one pedestrian 120 is located outside the vehicle 110. In some cases, there may be a plurality of pedestrians outside the vehicle 110. In this case, the computing device 140 may consider the attention state of each pedestrian to the vehicle 110, the position of the vehicle 110 noticed by each of the pedestrian, the relative position of each pedestrian and the vehicle 110, and the environment factor associated with each of the pedestrian, to determine the feedback information outputted by the vehicle 110. The vehicle 110 may output different feedback information for different pedestrians. For example, the relative positions of different pedestrians and the vehicle 110 may vary, or the positions of the vehicle 110 noticed by different pedestrians may vary, the corresponding determined output component of the vehicle 110 also may vary. In some embodiments, the computing device 140 may also control the vehicle 110 to output feedback information suitable for a group of pedestrians.

In the following, in order to better understand the determination of the feedback information based on the attention state (also the environment factor in some cases), exemplary scenarios and feedback information determined in these scenarios will be described.

Firstly, it is considered the scenario that, the attention state indicates that the pedestrian 120 notices the vehicle 110. In the scenario, it is assumed that the vehicle 110 and the pedestrian 120 are in an environment with relatively complete traffic guidance facilities, such as traffic lights, intersection signs, and crosswalk signs with normal operation. In the scenario, the computing device 140 may determine the feedback information 112 based on one or more of the position of the vehicle 110 noticed by the pedestrian 120, the current condition of the traffic light, and the motion trajectories of the vehicle 110 and the pedestrian 120.

For example, when it is detected that, the motion trajectory of the pedestrian 120 is to cross the intersection, the traffic light for the vehicle 110 is red or yellow indicating that traffic is prohibited or suspended, and the traffic light for the pedestrian 120 is green indicating traffic is allowed, the computing device 140 may generate guidance information for guiding the pedestrian 120 to cross the intersection. For example, the feedback information 112 may be content such as "please pass" displayed on the display screen, or a sign dynamically showing a travel direction, etc. The computing device 140 may determine the presentation time of the feedback information 112, for example, the presentation time may continue until the pedestrian 120 has crossed the intersection. In some cases, the computing device 140 may determine the display screen for displaying the feedback information based on the position of the vehicle 110 noticed by the pedestrian 120.

The computing device 140 may continuously change the feedback information 112. In some cases, the computing device 140 may determine interactive information as the feedback information 112. For example, when it is detected that the pedestrian 120 has crossed the intersection and may miss the vehicle 110 or is waving to the vehicle 110, the computing device 140 may display text such as "goodbye", emoji related to "goodbye", or other emoji related to "smile" on the display screen.

In an embodiment, when it is detected that the traffic light in the environment is about to change, the computing device 140 may output instruction information related to the current traffic condition. For example, when the traffic light for the vehicle 110 changes from green to red, a message such as "green light, pass please" may be determined and provided, to prompt the pedestrian 120 to wait for the green traffic light to pass, or to indicate the pedestrian 120 that the traffic is about to be allowed. For example, when the traffic light for the vehicle 110 changes from red to green, a message such as "light is about to change, please wait for next green light" may be determined and provided, to prompt the pedestrian 120 that the traffic is about to be prohibited.

In another embodiment, when it is detected that the pedestrian 120 notices the vehicle 110, and the pedestrian 120 and the vehicle 110 are in an environment with relatively complete traffic guidance facilities, the computing device 140 may determine instruction information related to the driving condition of the vehicle 110 as the feedback information 112. The instruction information may include, but is not limited to, a travel direction, a travel route, a travel speed, and an autonomous driving condition. The computing device 140 may also determine simple interactive information, such as interacting with the pedestrian (e.g., greeting), a current temperature, a weather forecast or other information, as the feedback information 112. The instruction information related to the driving condition and/or interactive information may be displayed by the display screen of the vehicle 110. The above information may also be alternatively indicated by the signal light or the light strip of the vehicle 110, for example, feedback information such as the flash of the streamlined light strip may be used to indicate the travel direction of the vehicle. Such display of the feedback information may be, for example, in the case where the motion trajectory of the pedestrian 120 does not intersect the motion trajectory of the vehicle 110, for there may be no need to give more instructions to protect the pedestrian's safety in this case. In some cases, the computing device 140 may also determine a projection pattern that can be outputted by a signal light having a projection function in the vehicle 110 for projecting a protection circle of the pedestrian 120 or guiding a travel path of the pedestrian 120.

In the second scenario, it is assumed that the attention state indicates that the pedestrian 120 notices the vehicle 110, and the vehicle 110 and the pedestrian 120 are in an environment where traffic guidance facilities are incomplete. In a scenario, the computing device 140 detects that there is no traffic light at the intersection to guide the pedestrian to cross the intersection. To protect the safety of the pedestrian, the computing device 140 may instruct the vehicle 110 to retrieve actively when approaching the pedestrian 120, and determine guidance information for guiding the pedestrian 120 to cross the intersection. For example, the vehicle 110 may output a projection pattern by a signal light having a projection function, to project a protection circle of the pedestrian 120 or guide a travel path of the pedestrian 120, the vehicle 110 may also display instruction information such as text "please pass" or a sign dynamically showing a travel direction by a display screen that can be noticed by the pedestrian 120. The computing device 140 may also determine the presentation time of the feedback information 112, for example, the presentation time may continue until the pedestrian 120 has crossed the intersection. In some cases, the computing device 140 may also determine interactive information as feedback information 112. For example, when it is detected that the pedestrian 120 has crossed the intersection and may miss the vehicle 110 or is waving to the vehicle 110, the computing device 140 may display text such as "goodbye", emoji related to "goodbye", or other emoji related to "smile" on the display screen.

In an environment where traffic guidance facilities are incomplete, when it is detected that the road where the vehicle 110 and/or the pedestrian 120 are located is relatively narrow, which may cause the vehicle 110 to be closer to the pedestrian 120, the computing device 140 may determine the corresponding guiding information for guiding the pedestrian. For example, when the vehicle 110 approaches the pedestrian 120, in addition to controlling the vehicle 110 to travel slowly, the projection pattern outputted by the signal light having the projection function may be determined as feedback information 112 for projecting a protection circle of the pedestrian 120 or guiding the travel path of the pedestrian 120, and/or for projecting the travel route of the vehicle 110. Alternatively, when the vehicle 110 passes the pedestrian 120, the computing device 140 may determine interactive information, such as text "Be careful of safety of narrow road, thank you" displayed by the side screen of the vehicle 110, as feedback information 112. When the vehicle 110 exceeds the pedestrian 120, the computing device 140 may display text such as "Have a nice day" on the rear-side screen of the vehicle 110.

In an extreme road condition, such as a road where the vehicle 110 and the pedestrian 120 cannot travel in parallel, the computing device 140 may control the vehicle 110 to stop when approaching the pedestrian 120, and determine the projection pattern for projecting a protection circle of the pedestrian 120 or guiding the travel path of the pedestrian 120. Moreover, text such as "don't worry, I am following" may be determined for display, to allow the pedestrian 120 to learn the driving intention of the vehicle 110, and to travel safely.

In the case where the road is narrow, in order to guide the travel of the pedestrian 120, it is also possible to determine whether it is necessary to emit illuminating light by the signal light of the vehicle 110 as the feedback information 112 according to the lighting condition of the current external environment, to improve the safety of the pedestrian.

In the third scenario, it is assumed that the attention state indicates that the pedestrian 120 notices the vehicle 110, and the computing device 140 detects that the behavior of the pedestrian 120, such as crossing the road, crossing the road barrier, crossing the highway without crosswalks, may violate the traffic rule. In this case, the computing device 140 may determine warning information related to a traffic rule as the feedback information 112. For example, the feedback information 112 may be determined as reminder text such as "Do not cross the road", "Highway dangerous" displayed on the screen of the vehicle 110. The feedback information 112 may also include warning information such as whistle or voice, such as directional voice signals emitted by the speaker of the vehicle 110.

In the following, exemplary scenarios where the attention state indicates that the pedestrian 120 fails to notice the vehicle 110 will be described. In an embodiment, when the computing device 140 detects that the pedestrian 120 is playing a phone, making a phone call, listening to music or other behaviors, and also detects that the pedestrian 120 is approaching a junction where pedestrians are currently prohibited (e.g., the traffic light for pedestrians is red), the computing device 140 may determine whether the expected motion trajectories of the vehicle 110 and the pedestrian 120 intersect. When their motion trajectories do not intersect, the computing device 140 may determine guidance information and/or interactive information, such as a projection pattern for projecting a protection circle of the pedestrian 120 or guiding the travel route of the pedestrian 120, to guide the pedestrian 120 to ensure the safety of the pedestrian 120. When their motion trajectories will intersect, the computing device 140 may additionally or alternatively determine warning information in the audible form, such as whistle or voice prompt emitted by the speaker of vehicle 110, to alert the pedestrian 120 to notice the vehicle.

The above describes the provision of targeted feedback information based on the attention state and one or more environment factors, it is to be understood that, the description of the above scenarios is merely illustrative, and different feedback information can be selected in different or similar scenarios depending on actual needs. By considering the attention state and the environmental factor, targeted feedback information can be provided to the pedestrian, making the interaction between the pedestrian and the vehicle more efficient and useful. In addition, the pedestrian can quickly learn information such as the vehicle and road traffic in a short interaction time, the safety of the environment of the pedestrian on the road can be improved.

Figure 4:
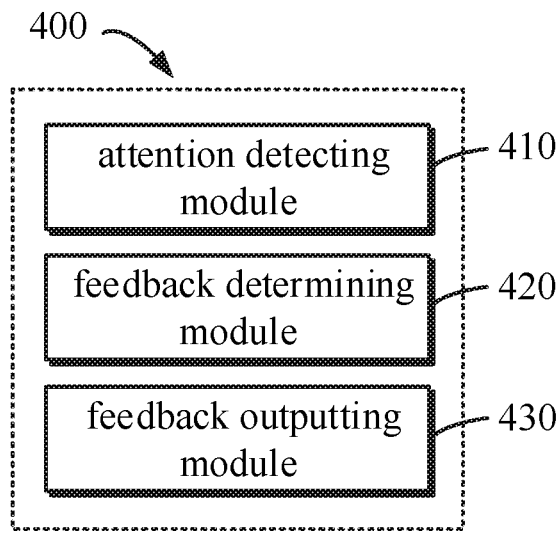
FIG. 4 is a block diagram of a device for providing feedback to outside a vehicle according to an embodiment of the present disclosure.

FIG. 4 is a block diagram of a device 400 for providing feedback to outside a vehicle according to an embodiment of the present disclosure. The device 400 may be included in the computing device 140 of FIG. 1, or may be implemented as the computing device 140. As shown in FIG. 4, the device 400 includes an attention detecting module 410, a feedback determining module 420, and a feedback outputting module 430. The attention detecting module 410 is configured to detect an attention state of a pedestrian to the vehicle. The attention state is configured to indicate whether the pedestrian notices the vehicle. The feedback determining module 420 is configured to determine feedback information of the vehicle to the pedestrian based at least in part on the attention state. The feedback outputting module 430 is configured to control an output component of the vehicle to output the feedback information.

In some embodiments, the feedback determining module 420 may include an environment detecting module, and an environment-based feedback determining module. The environment detecting module is configured to detect an environmental factor associated with at least one of the vehicle and the pedestrian. The environment-based feedback determining module is configured to determine the feedback information based on the environmental factor.

In some embodiments, the environment detecting module may be configured to detect at least one of: a condition of a road on which the vehicle is traveling; a condition of a traffic guidance facility on the road; an expected motion trajectory of the pedestrian; an expected motion trajectory of the vehicle; a predetermined behavior of the pedestrian; and a lighting condition outside the vehicle.

In some embodiments, the feedback outputting module 430 is configured to determine at least feedback information in an audible form in response to determining that the attention state indicates that the pedestrian fails to notice the vehicle.

In some embodiments, the device 400 further includes an output component determining module. The output component determining module is configured to determine an output component of the vehicle for outputting the feedback information based on the preset position, in response to determining that the attention state indicates the pedestrian notices a preset position of the vehicle.

In some embodiments, the output component of the vehicle may include at least one of: at least one display screen mounted outside the vehicle; at least one speaker; and at least one signal light.

In some embodiments, the feedback determining module is configured to determine at least one of: guidance information for travel of the pedestrian; warning information related to a traffic rule; instruction information related to a current traffic condition; instruction information related to a driving condition of the vehicle; and interactive information.

In some embodiments, the attention detecting module 410 may include an image acquiring module, a pedestrian presence analyzing module, and an attention analyzing module. The image acquiring module is configured to obtain image information of an ambient environment of the vehicle. The pedestrian presence analyzing module is configured to determine whether there is the pedestrian by analyzing the image information. The attention analyzing module is configured to determine the attention state of the pedestrian to the vehicle by analyzing the image information in response to determining that there is the pedestrian.

In some embodiments, the vehicle includes a vehicle having an automatic driving capability.

Figure 5:
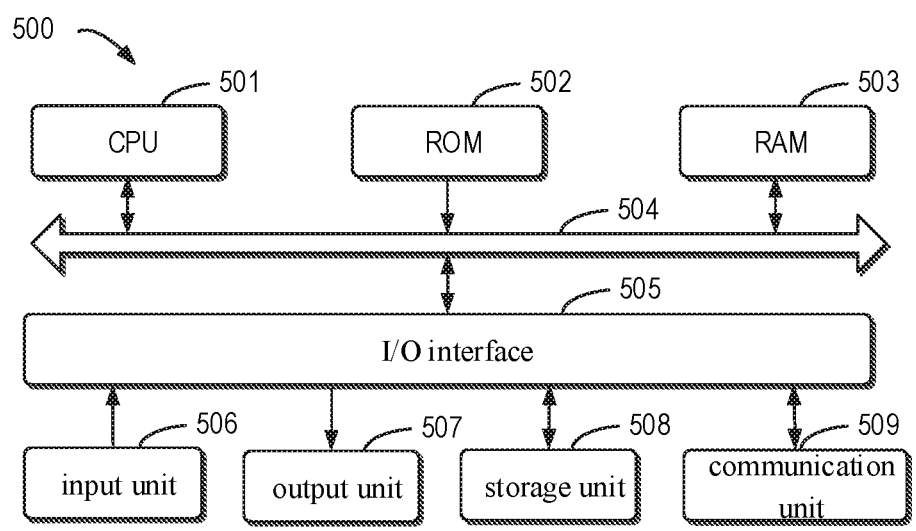
FIG. 5 is a block diagram of a computing device capable of implementing an embodiment of the present disclosure.

FIG. 5 is a schematic diagram of an exemplary device 500 capable of implementing an embodiment of the present disclosure. The device 500 may be configured to implement the computing device 140 of FIG. 1. As shown in FIG. 5, the device 500 includes a central processing unit (CPU) 501, which may be configured to perform various appropriate operations and processes based on computer program instructions stored in a ROM 502 or loaded from a storage unit 508 into a RAM 503. The RAM 503 may store various programs and data required for operations of the device 500. The CPU 501, the ROM 502 and the RAM 503 may be connected to each other through a bus 504. The input/output (I/O) interface 505 may also be coupled to the bus 504.

A plurality of components in the device 500 are coupled to the I/O interface 505, including: an input unit 506 such as a keyboard, a mouse, etc., an output unit 507 such as various types of displays, speakers, etc., a storage unit 508 such as a disk, an optical disk or the like, and a communication unit 509 such as a network card, a modem, a wireless communication transceiver, or the like. The communication unit 509 allows the device 500 to exchange information/data with other devices over a computer network such as Internet and/or various telecommunication networks.

The CPU 501 can perform various methods and processes described above, such as the process 300. For example, in some embodiments, the process 300 may be implemented as a computer software program that is tangibly embodied in a machine readable medium, such as the storage unit 508. In some embodiments, some or all of the computer program may be loaded and/or mounted on the device 500 via ROM 502 and/or the communication unit 509. One or more steps of the process 300 described above may be performed when the computer program is loaded into RAM 503 and executed by the CPU 501. Alternatively, in other embodiments, the CPU 501 may be configured to perform the process 300 by any other suitable means (e.g., by means of firmware).

The functions described above may be performed, at least in part, by one or more hardware logic components. For example, without any limitation, the exemplary type of the hardware logic component may include: Field Programmable Gate Array (FPGA), Application Specific Integrated Circuit (ASIC), Application Specific Standard Product (ASSP), System on Chip (SOC), Complex Programmable Logic Device (CPLD), etc.

The program code for implementing the method of the present disclosure may be written in any combination of one or more programming languages. The program code may be provided to a general-purpose computer, a special purpose computer or a processor or controller of other programmable data processing devices, such that the program code, when executed by the processor or controller, causes the functions/operations specified in the flowcharts and/or block diagrams to be implemented. The program code may be executed entirely on a machine, partially on a machine, partially on the machine as a separate package, partially on a remote machine, or entirely on a remote machine or server.

In the context of the present disclosure, a machine-readable medium may be a tangible medium that may contain or store programs for use by or in combination with an instruction execution system, apparatus or device. The machine-readable medium may be a machine-readable signal medium or a machine-readable storage medium. The machine-readable medium may include, but is not limited to, electronic, magnetic, optical, electromagnetic, infrared, or semiconductor system, apparatus or device, or any suitable combination of the above. More specific examples of the machine-readable storage medium may include electrical connections based on one or more wires, a portable computer disk, a hard disk, a random access memory (RAM), a read-only memory (ROM), an erasable programmable read-only memory (EPROM or Flash memory), an optical fiber, a compact disk-only memory (CD-ROM), an optical storage device, a magnetic storage device, or any suitable combination of the above.

In addition, although the operations are depicted in a particular order, it should be understood that such operations are required to be performed in the particular order shown or in the order, or that all illustrated operations should be performed to achieve the desired results. Multitasking and parallel processing may be advantageous in certain circumstances. Likewise, although several specific implementation details are included in the above discussion, these should not be construed as restrictions on the scope of the present disclosure. Certain features described in the context of individual embodiments may also be implemented in combination in a single implementation. Instead, various features described in the context of a single implementation may also be implemented in a plurality of implementations, either individually or in any suitable sub-combination.

Although the present disclosure has been described in language specific to structural features and/or methodological acts, it is understood that the subject matter defined in the appended claims is not limited to the specific features or acts described. Instead, the specific features and acts described above are merely exemplary forms of implementing the claims.

What is claimed is:

1. A method for providing feedback to outside a vehicle, comprising:
   detecting an attention state of a pedestrian to the vehicle, wherein the attention state is configured to indicate whether the pedestrian notices the vehicle;
   determining feedback information of the vehicle to the pedestrian based at least in part on the attention state; and
   controlling an output component of the vehicle to output the feedback information;
   wherein determining the feedback information comprises:
   in response to determining that the attention state indicates that the pedestrian notices the vehicle, determining at least feedback information in a visible form;
   the method further comprises:
   in response to determining that the attention state indicates the pedestrian notices a preset position of the vehicle, determining the output component of the vehicle for outputting the feedback information based on the preset position, wherein, the preset position is a position of the vehicle that noticed by the pedestrian, and that feedback information is output by the output component located at the position of the vehicle that noticed by the pedestrian;
   in response to that the pedestrian notices the vehicle, detecting that the vehicle and the pedestrian are in an environment without the traffic guidance facility, and determining guidance information as the feedback information for guiding the pedestrian to cross an intersection when approaching the pedestrian, wherein the guidance information is a projection pattern, and the projection pattern is outputted by a signal light of the vehicle is determined for projecting a protection circle of the pedestrian or guiding a travel path of the pedestrian, and/or for projecting a travel route of the vehicle.

2. The method according to claim 1, wherein determining the feedback information comprises:

in response to determining that the attention state indicates that the pedestrian fails to notice the vehicle, determining at least feedback information in an audible form.

3. The method according to claim 1, wherein the output component of the vehicle comprises at least one of:
   at least one display screen mounted outside the vehicle;
   at least one speaker; and
   at least one signal light.

4. The method according to claim 1, wherein the feedback information comprises at least one of:
   guidance information for travel of the pedestrian;
   warning information related to a traffic rule;
   instruction information related to a current traffic condition;
   instruction information related to a driving condition of the vehicle; and
   interactive information.

5. The method according to claim 1, wherein determining the attention state comprises:
   obtaining image information of an ambient environment of the vehicle;
   determining whether there is the pedestrian by analyzing the image information; and
   in response to determining that there is the pedestrian, determining the attention state of the pedestrian to the vehicle by analyzing the image information.

6. The method according to claim 1, wherein determining the feedback information comprises:
   in response to that the pedestrian notices the vehicle, and the vehicle and the pedestrian are in an environment with the traffic guidance facility, determining the feedback information based on one or more of the preset position of the vehicle noticed by the pedestrian, a current condition of the traffic guidance facility, and motion trajectories of the vehicle and the pedestrian; or
   in response to that the pedestrian notices the vehicle, and a behavior of the pedestrian violates a traffic rule, determining warning information related to the traffic rule as the feedback information.

7. The method according to claim 1, further comprising:
   detecting an environmental factor associated with at least one of the vehicle and the pedestrian;
   determining content, an output form, and a presentation time of the feedback information based at least in part on the attention state and the environmental factor.

8. The method according to claim 1, wherein determining the feedback information comprises:
   detecting an environmental factor associated with at least one of the vehicle and the pedestrian; and
   determining the feedback information based on the environmental factor.

9. The method according to claim 8, wherein the environmental factor comprises at least one of:
   a condition of a road on which the vehicle is traveling;
   a condition of a traffic guidance facility on the road;
   an expected motion trajectory of the pedestrian;
   an expected motion trajectory of the vehicle;
   a predetermined behavior of the pedestrian; and
   a lighting condition outside the vehicle.

10. A device for providing feedback to outside a vehicle, comprising:
    one or more processors; and
    a storage device, configured to store one or more programs,
    wherein, the one or more programs, when executed by the one or more processors, causes the one or more processors to:
    detect an attention state of a pedestrian to the vehicle, wherein the attention state is configured to indicate whether the pedestrian notices the vehicle;
    determine feedback information of the vehicle to the pedestrian based at least in part on the attention state; and
    control an output component of the vehicle to output the feedback information;
    wherein in determining the feedback information, the one or more processors are configured to: in response to determining that the attention state indicates that the pedestrian notices the vehicle, determine at least feedback information in a visible form;
    wherein the one or more processors are further configured to: determine the output component of the vehicle for outputting the feedback information based on the preset position, in response to determining that the attention state indicates the pedestrian notices a preset position of the vehicle, wherein, the preset position is a position of the vehicle that noticed by the pedestrian, and that feedback information is output by the output component located at the position of the vehicle that noticed by the pedestrian;
    wherein the one or more processors are further configured to: in response to that the pedestrian notices the vehicle, detecting that the vehicle and the pedestrian are in an environment without the traffic guidance facility, and determining guidance information as the feedback information for guiding the pedestrian to cross an intersection when approaching the pedestrian, wherein the guidance information is a projection pattern, and the projection pattern is outputted by a signal light of the vehicle is determined for projecting a protection circle of the pedestrian or guiding a travel path of the pedestrian, and/or for projecting a travel route of the vehicle.

11. The device according to claim 10, wherein in determining the feedback information, the one or more processors are configured to:
    in response to determining that the attention state indicates that the pedestrian fails to notice the vehicle, determine at least feedback information in an audible form.

12. The device according to claim 10, wherein the output component of the vehicle comprises at least one of:
    at least one display screen mounted outside the vehicle;
    at least one speaker; and
    at least one signal light.

13. The device according to claim 10, wherein the feedback information comprises at least one of:
    guidance information for travel of the pedestrian;
    warning information related to a traffic rule;
    instruction information related to a current traffic condition;
    instruction information related to a driving condition of the vehicle; and
    interactive information.

14. The device according to claim 10, wherein in determining the attention state, the one or more processors are further configured to:
    obtain image information of an ambient environment of the vehicle;
    determine whether there is the pedestrian by analyzing the image information; and in response to determining that there is the pedestrian, determine the attention state of the pedestrian to the vehicle by analyzing the image information.

15. The device according to claim 10, wherein in determining the feedback information, the one or more processors are configured to:
    detect an environmental factor associated with at least one of the vehicle and the pedestrian, and
    determine the feedback information based on the environmental factor.

16. The device according to claim 15, wherein the environmental factor comprises at least one of:
    a condition of a road on which the vehicle is traveling;
    a condition of a traffic guidance facility on the road;
    an expected motion trajectory of the pedestrian;
    an expected motion trajectory of the vehicle;
    a predetermined behavior of the pedestrian; and
    a lighting condition outside the vehicle.

17. A non-transitory computer readable storage medium having stored thereon a computer program that, when executed by a processor, causes a method for providing feedback to outside a vehicle to be implemented, the method comprising:
    detecting an attention state of a pedestrian to the vehicle, wherein the attention state is configured to indicate whether the pedestrian notices the vehicle;
    determining feedback information of the vehicle to the pedestrian based at least in part on the attention state; and
    controlling an output component of the vehicle to output the feedback information;
    wherein determining the feedback information comprises:
    in response to determining that the attention state indicates that the pedestrian notices the vehicle, determining at least feedback information in a visible form;
    the method further comprises:
    in response to determining that the attention state indicates the pedestrian notices a preset position of the vehicle, determining the output component of the vehicle for outputting the feedback information based on the preset position, wherein, the preset position is a position of the vehicle that noticed by the pedestrian, and that feedback information is output by the output component located at the position of the vehicle that noticed by the pedestrian;
    in response to that the pedestrian notices the vehicle, detecting that the vehicle and the pedestrian are in an environment without the traffic guidance facility, and determining guidance information as the feedback information for guiding the pedestrian to cross an intersection when approaching the pedestrian, wherein the guidance information is a projection pattern, and the projection pattern is outputted by a signal light of the vehicle is determined for projecting a protection circle of the pedestrian or guiding a travel path of the pedestrian, and/or for projecting a travel route of the vehicle.

* * * * *